United States Patent
Li et al.

(10) Patent No.: US 10,021,355 B2
(45) Date of Patent: Jul. 10, 2018

(54) METHOD AND DEVICE FOR PROCESSING REQUEST

(71) Applicant: Xiaomi Inc., Beijing (CN)

(72) Inventors: Feiyun Li, Beijing (CN); Changbing Chen, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 126 days.

(21) Appl. No.: 15/075,995

(22) Filed: Mar. 21, 2016

(65) Prior Publication Data

US 2016/0381324 A1 Dec. 29, 2016

(30) Foreign Application Priority Data

Jun. 26, 2015 (CN) .......................... 2015 1 0369410

(51) Int. Cl.
*H04N 7/18* (2006.01)
*G06F 17/30* (2006.01)
*H04L 29/06* (2006.01)
*H04L 29/08* (2006.01)
*H04W 12/08* (2009.01)

(52) U.S. Cl.
CPC ......... *H04N 7/183* (2013.01); *G06F 17/3028* (2013.01); *G06F 17/30964* (2013.01); *H04L 63/101* (2013.01); *H04L 65/4069* (2013.01); *H04L 67/26* (2013.01); *H04N 7/18* (2013.01); *H04W 12/08* (2013.01)

(58) Field of Classification Search
CPC ... H04L 63/101; H04L 67/26; H04L 65/4069; H04N 7/183; G06F 17/3028; G06F 17/30964
See application file for complete search history.

(56) References Cited

U.S. PATENT DOCUMENTS

2001/0045983 A1* 11/2001 Okazaki ................ H04L 63/101
348/211.99
2015/0142686 A1* 5/2015 Baldwin .............. G06Q 50/265
705/325

FOREIGN PATENT DOCUMENTS

| CN | 103095658 A | 5/2013 |
| CN | 103338188 A | 10/2013 |
| CN | 104660480 A | 5/2015 |
| JP | 2003296193 A | 10/2003 |

(Continued)

OTHER PUBLICATIONS

Office Action dated Jul. 11, 2017, in counterpart Japanese Application No. 2016-518074 and Engiish translation thereof.

(Continued)

*Primary Examiner* — Beemnet Dada
(74) *Attorney, Agent, or Firm* — Finnegan, Henderson, Farabow, Garrett & Dunner LLP (57) ABSTRACT

A method for processing a request includes receiving a query request sent by a first terminal. The query request is configured to request to query camera data collected by a camera, the camera data including at least one of image data or video data. The method further includes judging whether an account corresponding to the first terminal has a permission to obtain the camera data according to the query request and pushing a prompt message to a second terminal bound to the camera if the account corresponding to the first terminal does not have the permission. The prompt message is configured to prompt that the camera data is accessed abnormally.

12 Claims, 4 Drawing Sheets

(56) References Cited

FOREIGN PATENT DOCUMENTS

| | | |
|---|---|---|
| JP | 2004320513 A | 11/2004 |
| JP | 2008066303 A | 3/2008 |
| KR | 20050005151 A | 1/2005 |
| KR | 20060057954 A | 5/2006 |
| KR | 20120041571 A | 5/2012 |
| WO | WO 01/99375 A1 | 12/2001 |
| WO | WO 2009/053990 A2 | 4/2009 |
| WO | WO 2009/149466 A1 | 12/2009 |

OTHER PUBLICATIONS

Office Action dated Jun. 1, 2017, in counterpart Korean Application No. 10-2016-7012301 and English translation thereof.
Extended Search Report for European Application No. 16165149.2 from the European Patent Office, dated Nov. 21, 2015.
International Search Report of PCT Application No. PCT/CN2015/090604, dated Mar. 31, 2016, issued by the ISA/CN—State Intellectual Property Office of the P.R. China.

* cited by examiner

METHOD AND DEVICE FOR PROCESSING REQUEST

CROSS REFERENCE TO RELATED APPLICATION

This application is based upon and claims priority to Chinese Patent Application No. 201510369410.8, filed with the State Intellectual Property Office of P. R. China on Jun. 26, 2015, the entire contents of which are incorporated herein by reference.

TECHNICAL FIELD

The present disclosure relates to a smart home and, more particularly, to a method and device for processing a request.

BACKGROUND

An intelligent camera is one of important components in a smart home. Camera data collected by the intelligent camera may be pushed to a smartphone and other monitoring terminals of a user, so that the user can view it.

In conventional technologies, an account of an intelligent camera owner may share a usage permission of the camera with a specified account via a mobile phone client. The specified account, after obtaining the usage permission, can initiate a request to a server for viewing a real-time video of the camera. After verification, the camera sends compressed real-time video stream data to the mobile phone client to which the specified account is logged in, and then software in the mobile phone client can display the video content after decompression.

SUMMARY

In accordance with the present disclosure, there is provided a method for processing a request. The method includes receiving a query request sent by a first terminal. The query request is configured to request to query camera data collected by a camera, the camera data including at least one of image data or video data. The method further includes judging whether an account corresponding to the first terminal has a permission to obtain the camera data according to the query request and pushing a prompt message to a second terminal bound to the camera if the account corresponding to the first terminal does not have the permission. The prompt message is configured to prompt that the camera data is accessed abnormally.

Also in accordance with the present disclosure, there is provided a device for processing a request. The device includes a processor and a memory storing instructions that, when executed by the processor, cause the processor to receive a query request sent by a first terminal. The query request is configured to request to query camera data collected by a camera, the camera data including at least one of image data or video data. The instructions further cause the processor to judge whether an account corresponding to the first terminal has a permission to obtain the camera data according to the query request and push a prompt message to a second terminal bound to the camera if the account corresponding to the first terminal does not have the permission. The prompt message is configured to prompt that the camera data is accessed abnormally.

Also in accordance with the present disclosure, there is provided a non-transitory computer-readable storage medium having stored therein instructions that, when executed by a processor of a device, causes the device to receive a query request sent by a first terminal. The query request is configured to request to query camera data collected by a camera, the camera data including at least one of image data or video data. The instructions further cause the device to judge whether an account corresponding to the first terminal has a permission to obtain the camera data according to the query request and push a prompt message to a second terminal bound to the camera if the account corresponding to the first terminal does not have the permission. The prompt message is configured to prompt that the camera data is accessed abnormally.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Figure 1:
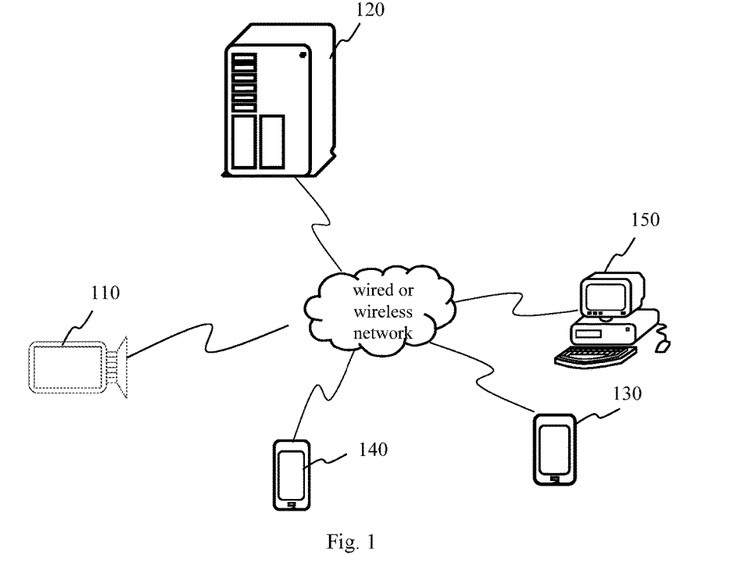
FIG. 1 is a schematic diagram illustrating an implementing environment involved by a method for processing a request according to exemplary embodiments.

FIG. 1 is a schematic diagram illustrating an implementing environment involved by a method for processing a request according to exemplary embodiments of the present disclosure. As shown in FIG. 1, the implementing environment includes a camera 110, a server 120, a first terminal 130, a second terminal 140, and a third terminal 150. The camera 110, the first terminal 130, the second terminal 140, and the third terminal 150 are each coupled to the server 120 via a wired or wireless network. Image data and/or video data collected by the camera 110 is stored in the server 120. The server 120 provides a video data pushing service to each user terminal. The first terminal 130 and the second terminal 140 may each be a smartphone, a tablet computer, an e-book reader, a personal computer, or another user terminal. The third terminal 150 is a terminal for use by managers of the server 120 for maintaining and managing the server 120 and the data in the server 120.

Figure 2:
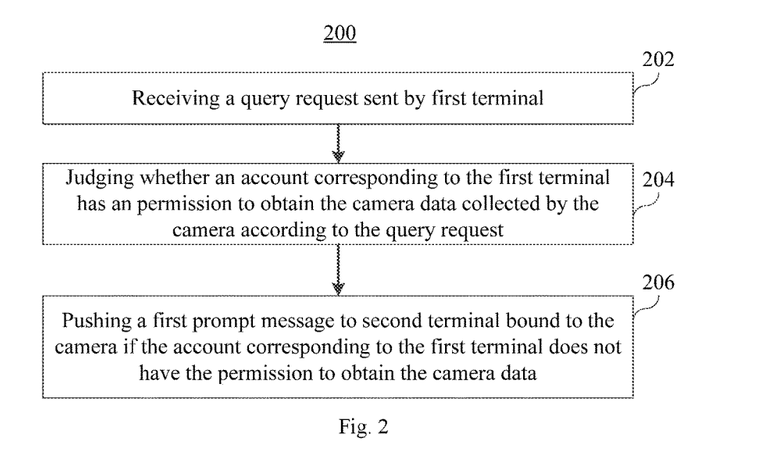
FIG. 2 is a flow chart showing a method for processing a request according to an exemplary embodiment.

FIG. 2 is a flow chart showing a method 200 for processing a request according to an exemplary embodiment. The method 200 can be implemented, for example, in the server 120 of the implementing environment shown in FIG. 1. As shown in FIG. 2, at 202, a query request sent by the first terminal 130 is received. The query request is configured to request to query camera data collected by the camera 110. The camera data includes at least one of image data or video data. At 204, it is judged whether an account corresponding to the first terminal 130 has a permission to obtain the camera data collected by the camera 110 according to the query request. At 206, a first prompt message is pushed to the second terminal 140 bound to the camera 110 if the account corresponding to the first terminal 130 does not have the permission to obtain the camera data collected by the camera 110. The first prompt message is configured to prompt that the camera data is accessed abnormally.

In some embodiments, the server 120 further pushes a second prompt message to the third terminal 150 if the account corresponding to the first terminal 130 does not have the permission to obtain the camera data collected by the camera 110. The second prompt message is configured to prompt whether to track the first terminal 130.

In some embodiments, the query request includes the account corresponding to the first terminal 130. To judge whether the account corresponding to the first terminal 130 has the permission to obtain the camera data, the server 120 detects whether the account corresponding to the first terminal 130 is in an access permission list corresponding to the camera 110. The access permission list includes accounts corresponding to terminals having permission to obtain the camera data collected by the camera 110. The server 120 further determines that the account corresponding to the first terminal 130 has the permission to obtain the camera data collected by the camera 110 if the account corresponding to the first terminal 130 is in the access permission list, and determines that the account corresponding to the first terminal 130 does not have the permission to obtain the camera data collected by the camera 110 if the account corresponding to the first terminal 130 is not in the access permission list.

In some embodiments, before receiving the query request sent by the first terminal 130, the server 120 receives a binding request sent by the second terminal 140 or the camera 110. The binding request includes an account corresponding to the second terminal 140. The server adds the account corresponding to the second terminal 140 to the access permission list.

In some embodiments, the server 120 further receives a sharing request sent by the second terminal 140. The sharing request includes an account corresponding to a fourth terminal. The server 120 adds the account corresponding to the fourth terminal to the access permission list.

Figure 3:
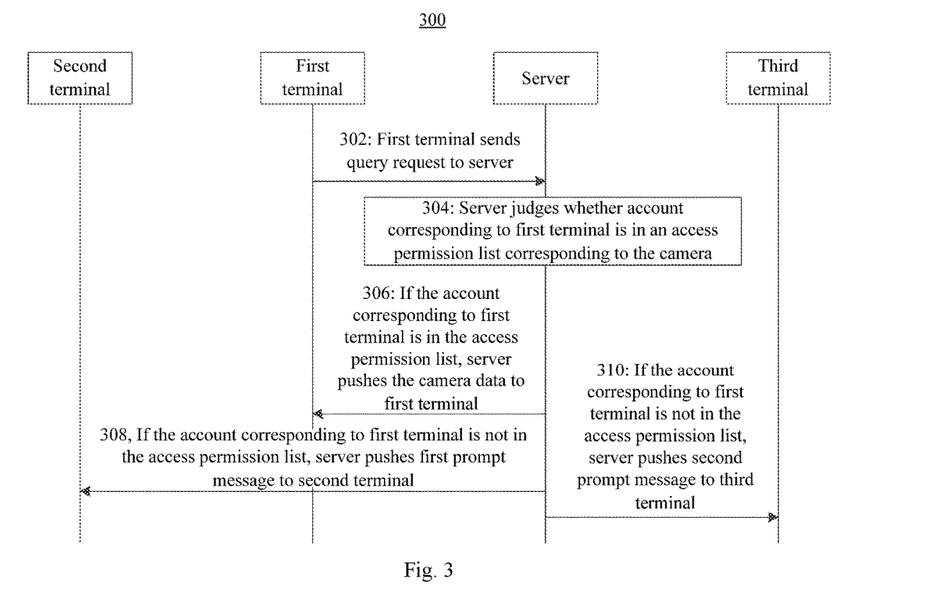
FIG. 3 is a flow chart showing a method for processing a request according to another exemplary embodiment.

FIG. 3 is a flow chart showing a method 300 for processing a request according to another exemplary embodiment. The method 300 can be implemented, for example, in the server 120 of the implementing environment shown in FIG. 1. As shown in FIG. 3, at 302, the first terminal 130 sends a query request to the server 120. The query request includes an account corresponding to the first terminal 130 and is configured to request to query camera data collected by the camera 110.

That is, when a user of the first terminal 130 wishes to view the camera data collected by the camera 110, the user can send the query request to the server 120 using the first terminal 130. For example, after the first terminal 130 accesses a local area network (LAN) in which the camera 110 is included, the first terminal 130 obtains a camera file list containing the camera data collected by the camera 110 and displays the camera file list to the user. After the user selects one camera file from the camera file list, the first terminal 130 sends the request for querying the camera data corresponding to the selected camera file to the server. In this scenario, the request can include, for example, the account corresponding to the first terminal 130, an identification of the selected camera file, an identification of the camera 110, etc.

At 304, the server 120 judges whether the account corresponding to the first terminal 130 is in an access permission list corresponding to the camera 110. For example, after receiving the query request sent by the first terminal 130, the server 120 can query the access permission list corresponding to the camera 110 according to the identification of the camera 110 included in the query request, and judge whether the account corresponding to the first terminal 130 is in the access permission list. If the account corresponding to the first terminal 130 is in the access permission list, the server 120 determines that the account corresponding to the first terminal 130 has the permission to obtain the camera data collected by the camera 110, and the process proceeds to 306. On the other hand, if the account corresponding to the first terminal 130 is not in the access permission list, the server 120 determines that the account corresponding to the first terminal 130 does not have the permission to obtain the camera data collected by the camera 110, and the process proceeds to 308 and 310.

At 306, i.e., when the account corresponding to the first terminal 130 is in the access permission list, the camera data is pushed to the first terminal 130. According to the present disclosure, the account corresponding to the first terminal 130 being in the access permission list indicates that the user of the second terminal 140 has already shared the camera data collected by the camera 110 with the account corresponding to the first terminal 130. Therefore, the server 120 can query the corresponding camera data according to the identification of the camera file included in the query request sent by the first terminal 130, and then send the queried camera data to the first terminal 130.

At 308, i.e., when the account corresponding to the first terminal 130 is not in the access permission list, a first prompt message is pushed to the second terminal 140. The first prompt message is configured to prompt that the camera data is accessed abnormally. According to the present disclosure, the account corresponding to the first terminal 130 not being in the access permission list indicates that the user of the second terminal 140 is not sharing the camera data collected by the camera 110 with the account corresponding to the first terminal, and thus it is determined that the first terminal 130 accesses the camera file abnormally. Therefore, the server 120 can push the first prompt message to the second terminal 140, to prompt the user of the second terminal 140 that someone accesses the camera file collected by the camera abnormally, and to alert the user to pay attention to the security of the camera data.

At 310, i.e., when the account corresponding to the first terminal 130 is not in the access permission list, a second prompt message is pushed to the third terminal 150. The second prompt message is configured to prompt whether to track the first terminal 130. That is, in some embodiments, after determining that the first terminal 130 accesses the camera file abnormally, the server 120 can also push the second prompt message to the third terminal 150 corresponding to managers of the server 120, to prompt the managers to decide whether to track the first terminal 130.

Figure 4:
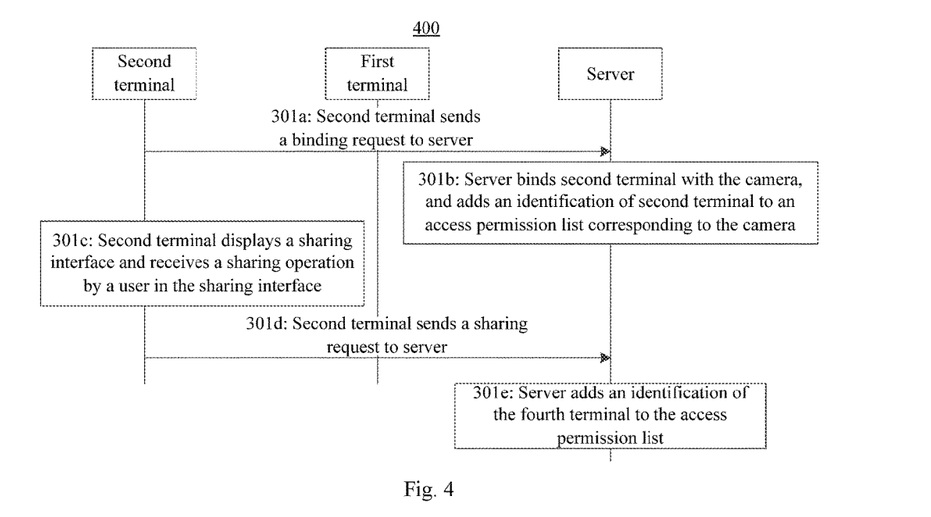
FIG. 4 is a flow chart showing a method for adding an account according to an exemplary embodiment.

FIG. 4 is a flow chart showing a method 400 for adding an account according to an exemplary embodiment. The added account is granted a permission to obtain and view the camera data collected by the camera 110. As shown in FIG. 4, at 301a, the second terminal 140 sends a binding request to the server 120. The binding request includes an account corresponding to the second terminal 140 and an identification of the camera 110.

In a smart home, after the camera 110 is installed for the first time, a terminal needs to be first bound to the camera 110 before the terminal can have a permission to control the camera 110. For example, the user can send the binding request to the server 120 using the second terminal 140, or send the binding request to the server 120 using the camera 110.

At 301b, the server 120 binds the second terminal 140 with the camera 110, and adds an identification of the second terminal 140 to an access permission list corresponding to the camera 110. That is, after receiving the binding request sent by the second terminal 140, the server 120 establishes a corresponding relationship between the account corresponding to the second terminal 140 and the identification of the camera 110, to bind the second terminal 140 with the camera 110 as a control terminal of the camera 110. In some embodiments, the second terminal 140 has a full permission of controlling the camera 110, and other unbound terminals cannot control the camera 110. In some embodiments, the other unbound terminals can only control part of the functions of the camera 110. After binding the second terminal 140, the server 120 can also add the account corresponding to the second terminal 140 to the access permission list corresponding to the camera 110.

At 301c, the second terminal 140 displays a sharing interface and receives a sharing operation by the user in the sharing interface. The sharing operation is an operation of sharing the camera data collected by the camera 110 with a fourth terminal. That is, after the second terminal 140 is bound to the camera 110, the user of the second terminal 140 can share the permission to obtain the camera data collected by the camera 110 with other terminals via the second terminal 140. For example, the sharing interface includes a sharing button. When the user clicks the sharing button, a terminal selection box pops up, and the user can select the account corresponding to the fourth terminal, with which the camera data is intended to be shared. The account may be, for example, a user name or an email, etc.

At 301d, the second terminal 140 sends a sharing request to the server 110. The sharing request includes the account corresponding to the fourth terminal. That is, after the user selects the fourth terminal in the terminal selection box and determines to share, the second terminal 140 sends the sharing request including the account corresponding to the fourth terminal to the server 120.

At 301e, the server 120 adds an identification of the fourth terminal to the access permission list. That is, after receiving the sharing request and verifying that the second terminal 140 is a terminal bound to the camera 110, the server 120 adds the account corresponding to the fourth terminal to the access permission list.

Figure 5:
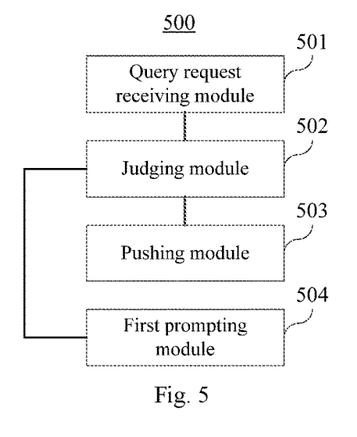
FIG. 5 is a block diagram showing a device for processing a request according to an exemplary embodiment.

FIG. 5 is a block diagram showing a device 500 for processing a request according to an exemplary embodiment. The device 500 can be implemented, for example, in the server 120 of the implementing environment shown in FIG. 1, and perform all or part of a method consistent with embodiments of the present disclosure, such as those described above in connection with FIGS. 2-4. As shown in FIG. 5, the device 500 includes, but is not limited to, a query request receiving module 501, a judging module 502, a pushing module 503, and a first prompting module 504. The query request receiving module 501 is configured to receive a query request sent by the first terminal 130. The query request is configured to request to query camera data collected by the camera 110. The judging module 502 is configured to judge whether the first terminal 130 has a permission to obtain the camera data collected by the camera 110 according to the query request. The pushing module 503 is configured to push the camera data to the first terminal 130 if the first terminal 130 has the permission to obtain the camera data collected by the camera 110. The first prompting module 504 is configured to push a first prompt message to the second terminal 140 if the first terminal 130 does not have the permission to obtain the camera data collected by the camera 110.

In some embodiments, the second terminal 140 is a terminal that is bound to the camera 110. The first prompt message is configured to prompt that the camera data collected by the camera 110 is accessed by the first terminal 130 abnormally.

Figure 6:
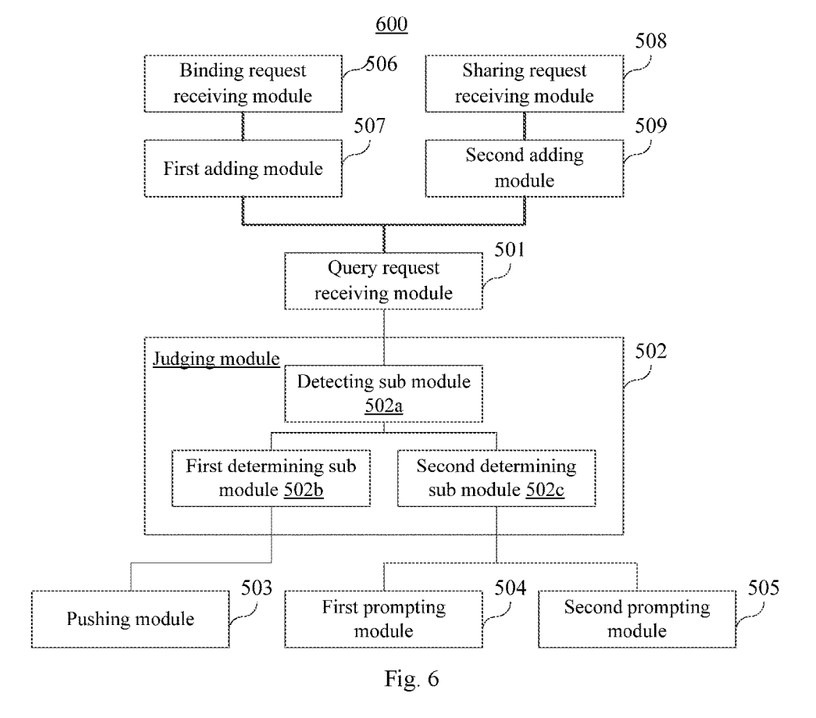
FIG. 6 is a block diagram showing a device for processing a request according to another exemplary embodiment.

FIG. 6 is a block diagram showing a device 600 for processing a request according to another exemplary embodiment. The device 600 can be implemented, for example, in the server 120 of the implementing environment shown in FIG. 1, and perform all or part of a method consistent with embodiments of the present disclosure, such as those described above in connection with FIGS. 2-4. As shown in FIG. 6, the device 600 includes, but is not limited to, the query request receiving module 501, the judging module 502, the pushing module 503, the first prompting module 504, and a second prompting module 505. The second prompting module 505 is configured to push a second prompt message to the third terminal 150 if the account corresponding to the first terminal 130 does not have the permission to obtain the camera data collected by the camera 110. The third terminal 150 is a terminal for maintaining and managing the camera data collected by the camera 110, and the second prompt message is configured to prompt whether to track the first terminal 130.

In some embodiments, the query request includes the account corresponding to the first terminal 130, and, as shown in FIG. 6, the judging module 502 includes a detecting sub module 502a, a first determining sub module 502b, and a second determining sub module 502c. The detecting sub module 502a is configured to detect whether the account corresponding to the first terminal 130 is in an access permission list corresponding to the camera 110. The access permission list includes accounts corresponding to terminals having the permission to obtain the camera data collected by the camera 110. The first determining sub module 502b is configured to determine that the account corresponding to the first terminal 130 has the permission to obtain the camera data collected by the camera 110 if the account corresponding to the first terminal 130 is in the access permission list. The second determining sub module 502c is configured to determine that the account corresponding to the first terminal 130 does not have the permission to obtain the camera data collected by the camera 110 if the account corresponding to the first terminal 130 is not in the access permission list.

In some embodiments, as shown in FIG. 6, the device 600 further includes a binding request receiving module 506 and a first adding module 507. The binding request receiving module 506 is configured to receive a binding request sent by the second terminal 140 or by the camera 110 before the query request receiving module 501 receives the query request sent by the first terminal 130. The binding request includes an account corresponding to the second terminal 140. The first adding module 507 is configured to add the account corresponding to the second terminal 140 to the access permission list.

In some embodiments, as shown in FIG. 6, the device 600 further includes a sharing request receiving module 508 and a second adding module 509. The sharing request receiving module 508 is configured to receive a sharing request sent by the second terminal 140. The sharing request includes an account corresponding to a fourth terminal. The second adding module 509 is configured to add the account corresponding to the fourth terminal to the access permission list.

Figure 7:
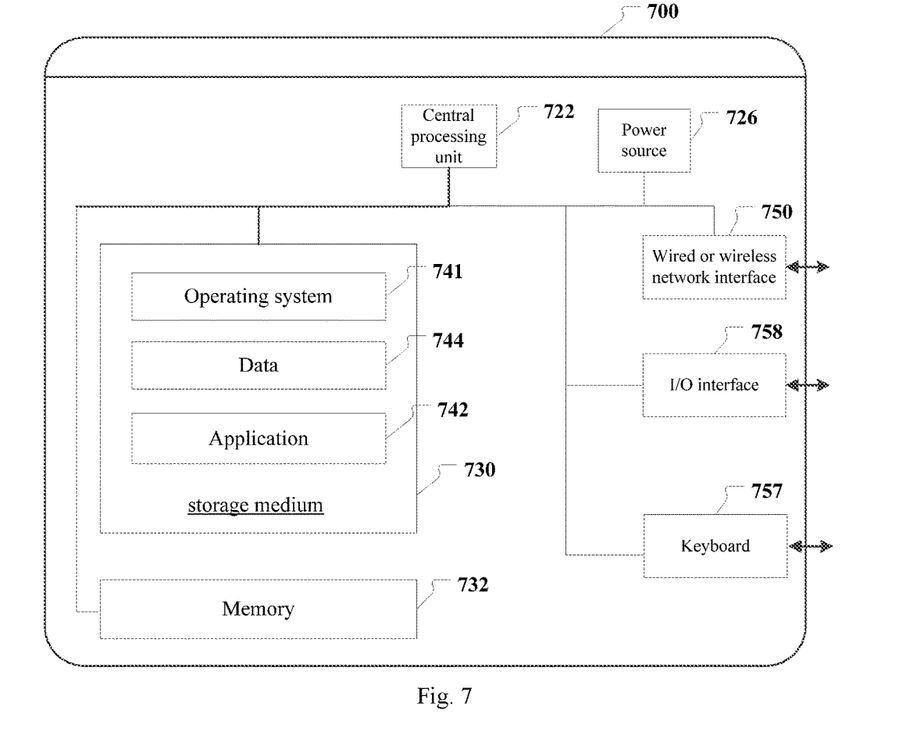
FIG. 7 is a block diagram showing a device according to another exemplary embodiment.

FIG. 7 is a block diagram showing a device 700 according to another exemplary embodiment. The device 700 includes one or more central processing units (CPUs) 722 (e.g., one or more processors), a memory 732, one or more storage mediums 730 (e.g. one or more mass storage devices) for storing applications 742 or data 744. The memory 732 and the storage medium 730 may be a non-transitory storage memory. The programs stored in the storage medium 730 may include one or more modules (not shown), each module may include a series of instruction for the operations of the device 700, and the series of instructions may be configured to implement all or part of a method consistent with embodiments of the present disclosure, such as those described above in connection with FIGS. 2-4. Moreover, the central processing unit 722 is configured to communicate with the storage medium 730 to perform the series of instructions stored in the storage medium 730 on the device 700.

The device 700 also includes one or more power sources 726, one or more wired or wireless network interfaces 750, one or more input-output (I/O) interfaces 758, one or more keyboards 757, and/or, one or more operating systems 741, for example, Windows Server™, Mac OS X™, Unix™, Linux™, FreeBSD™, etc.

With respect to the devices in the above embodiments, the specific manners for performing operations for individual modules therein are similar to the exemplary methods described above, and thus are not repeated here.

According to the present disclosure, only a user having the permission to obtain camera data can view image data or video data collected by a camera. The user may be associated with an account bound with the camera or an account with which the camera data is being shared. Moreover, a prompt of abnormal access can be timely sent out to both the user associated with the camera and managers of a server storing the camera data. As such, security of the camera data is improved.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for processing a request, comprising:
receiving a query request sent by a first terminal, the query request being configured to request to query camera data collected by a camera, the camera data including at least one of image data or video data;
judging whether an account corresponding to the first terminal has a permission to obtain the camera data according to the query request; and
if the account corresponding to the first terminal does not have the permission,
pushing a first prompt message to a second terminal bound to the camera, the first prompt message being configured to prompt that the camera data is accessed abnormally; and
pushing a second prompt message to a third terminal, the third terminal being configured to manage the camera data, and the second prompt message being configured to prompt whether to track the first terminal.

2. The method according to claim 1, wherein:
the query request includes the account corresponding to the first terminal, and
judging whether the account corresponding to the first terminal has the permission includes:
detecting whether the account corresponding to the first terminal is in an access permission list corresponding to the camera, the access permission list including accounts corresponding to terminals having the permission;
determining that the account corresponding to the first terminal has the permission if the account corresponding to the first terminal is in the access permission list; and
determining that the account corresponding to the first terminal does not have the permission if the account corresponding to the first terminal is not in the access permission list.

3. The method according to claim 2, further comprising, before receiving the query request:
receiving a binding request sent by the second terminal or the camera, the binding request including an account corresponding to the second terminal; and
adding the account corresponding to the second terminal to the access permission list.

4. The method according to claim 2, further comprising:
receiving a sharing request sent by the second terminal, the sharing request including an account corresponding to a fourth terminal; and
adding the account corresponding to the fourth terminal to the access permission list.

5. A device for processing a request, comprising:
a processor; and
a memory storing instructions that, when executed by the processor, cause the processor to:
receive a query request sent by a first terminal, the query request being configured to request to query camera data collected by a camera, the camera data including at least one of image data or video data;
judge whether an account corresponding to the first terminal has a permission to obtain the camera data according to the query request; and
if the account corresponding to the first terminal does not have the permission,
push a first prompt message to a second terminal bound to the camera, the first prompt message being configured to prompt that the camera data is accessed abnormally; and
push a second prompt message to a third terminal, the third terminal being configured to manage the camera data, and the second prompt message being configured to prompt whether to track the first terminal.

6. The device according to claim 5, wherein the query request includes the account corresponding to the first terminal;

the instructions further causing the processor to:
detect whether the account corresponding to the first terminal is in an access permission list corresponding to the camera, the access permission list including accounts corresponding to terminals having the permission;
determine that the account corresponding to the first terminal has the permission if the account corresponding to the first terminal is in the access permission list; and
determine that the account corresponding to the first terminal does not have the permission if the account corresponding to the first terminal is not in the access permission list.

7. The device according to claim 6, the instructions further causing the processor to, before receiving the query request:
receive a binding request sent by the second terminal or the camera, the binding request including an account corresponding to the second terminal; and
add the account corresponding to the second terminal to the access permission list.

8. The device according to claim 6, the instructions further causing the processor to:
receive a sharing request sent by the second terminal, the sharing request including an account corresponding to a fourth terminal; and
add the account corresponding to the fourth terminal to the access permission list.

9. A non-transitory computer-readable storage medium having stored therein instructions that, when executed by a processor of a device, causes the device to:
receive a query request sent by a first terminal, the query request being configured to request to query camera data collected by a camera, the camera data including at least one of image data or video data;
judge whether an account corresponding to the first terminal has a permission to obtain the camera data according to the query request; and
if the account corresponding to the first terminal does not have the permission,
push a first prompt message to a second terminal bound to the camera, the first prompt message being configured to prompt that the camera data is accessed abnormally; and
push a second prompt message to a third terminal, the third terminal being configured to manage the camera data, and the second prompt message being configured to prompt whether to track the first terminal.

10. The non-transitory computer-readable storage medium according to claim 9, wherein the query request includes the account corresponding to the first terminal;

the instructions further causing the device to:
detect whether the account corresponding to the first terminal is in an access permission list corresponding to the camera, the access permission list including accounts corresponding to terminals having the permission;
determine that the account corresponding to the first terminal has the permission if the account corresponding to the first terminal is in the access permission list; and
determine that the account corresponding to the first terminal does not have the permission if the account corresponding to the first terminal is not in the access permission list.

11. The non-transitory computer-readable storage medium according to claim 10, the instructions further causing the device to, before receiving the query request:
receive a binding request sent by the second terminal or the camera, the binding request including an account corresponding to the second terminal; and
add the account corresponding to the second terminal to the access permission list.

12. The non-transitory computer-readable storage medium according to claim 10, the instructions further causing the device to:
receive a sharing request sent by the second terminal, the sharing request including an account corresponding to a fourth terminal; and
add the account corresponding to the fourth terminal to the access permission list.

* * * * *